United States Patent [19]

Nagasawa

[11] 4,075,989
[45] Feb. 28, 1978

[54] METHOD FOR OPERATING 2-CYCLE INTERNAL COMBUSTION ENGINE

[75] Inventor: Masao Nagasawa, Kariya, Japan

[73] Assignee: Nippondenso Co., Ltd., Kariya, Japan

[21] Appl. No.: 696,848

[22] Filed: Jun. 16, 1976

Related U.S. Application Data

[63] Continuation-in-part of Ser. No. 637,185, Dec. 3, 1975.

[30] Foreign Application Priority Data

| Dec. 9, 1974 | Japan | 50-141928 |
| Jan. 27, 1975 | Japan | 50-12183 |
| Mar. 5, 1975 | Japan | 50-27492 |
| Aug. 2, 1975 | Japan | 50-107750 |
| Jun. 28, 1975 | Japan | 50-80418 |

[51] Int. Cl.² .............................................. F02P 5/04
[52] U.S. Cl. ........................... 123/117 R; 123/148 CC
[58] Field of Search ........ 123/117 R, 117 A, 148 CC, 123/148 DS, 148 CA, 148 CB, 148 R, 148 MD, 148 E

[56] References Cited

U.S. PATENT DOCUMENTS

| 3,277,875 | 10/1966 | Miki | 123/148 E |
| 3,521,611 | 7/1970 | Finch | 123/117 R |
| 3,800,757 | 4/1974 | Finch | 123/148 E |
| 3,955,723 | 5/1976 | Richards | 123/148 E |

Primary Examiner—Samuel Feinberg
Attorney, Agent, or Firm—Cushman, Darby & Cushman

[57] ABSTRACT

An ignition timing for a 2-cycle internal combustion engine is sharply and continuously retarded as the engine speed increases above a set engine speed at which the engine can produce a maximum output power, whereby the engine output power is gradually decreased above the set engine speed.

4 Claims, 4 Drawing Figures

METHOD FOR OPERATING 2-CYCLE INTERNAL COMBUSTION ENGINE

CROSS REFERENCE TO RELATED APPLICATION

This application is a continuation-in-part of a copending application Ser. No. 637,185 filed on Dec. 3, 1975.

BACKGROUND OF THE INVENTION

1. Field of the Invention

The present invention relates to a method for operating a 2-cycle internal combustion engine, more especially to a method of surely igniting air-fuel mixture in a 2-cycle internal combustion engine during even high-speed running ranges.

2. Description of Prior Arts

In a conventional 2-cycle internal combustion engine, the ignition timing is generally retarded during low-speed running ranges with respect to that during the high-speed running ranges so that starting performance such as a stable operation during the low-speed running range may be ensured. On the contrary, while the engine is operated at high speeds, the ignition timing is fixed and rather gradually retarded as the engine speed increases to obtain a maximum output power.

In a typical 2-cycle engine of the type which is designed for speed races, the cylinder volume or the crank volume, port timings (closing and opening timings of an intake and/or exhaust valve) and pressure variations at the intake and the exhaust system are matched with each other to obtain a maximum torque at a set rotational speed of the engine. However, it was impossible to match the above cylinder volume, port timing etc. with each other above the set rotational speed, causing a decrease of the torque.

With consideration why the engine torque is decreased above the set rotational speed, it is found that the amount of newly introduced air-fuel mixture in the combustion chamber at every suction stroke decreases while the amount of residual burnt gases increases since the scavenging operation can not be sufficiently carried out during the exhaust stroke because of no-matching between the pressure variations at the exhaust pipe and the port timings. The cylinder temperature thereby increases over the normal temperature, causing actinations of the mixture such as atomization of the fuel, resolving of the fuel and so on, whereby igniting time and/or velocity of combustion of the mixture is considered to be shorter. In this occasion, the pressure in the combustion chamber reaches the maximum before the piston goes up to the top dead center, so that the piston is pushed downwardly with the result that the output power is reduced, the oil lubrication for the piston is adversely affected and so on. This is proved by our tests in that so-called "Chiri-Chiri" sounds are observed at the high speed operation. Therefore, it will be necessary to retard the ignition timing to restore the combustion of the mixture to its proper operation by such an amount as is equal to the shortened igniting time.

SUMMARY OF THE INVENTION

It is therefore an object of the present invention to provide an improved method for operating a 2-cycle internal combustion engine by which an ignition timing is continuously retarded as the engine speed increases above a set rotational speed at which a maximum torque is obtained, to thereby enable the engine to stably operate during the high-speed running ranges even above the set rotational speed.

DETAILED DESCRIPTION OF THE PREFERRED EMBODIMENT

Figure 1:
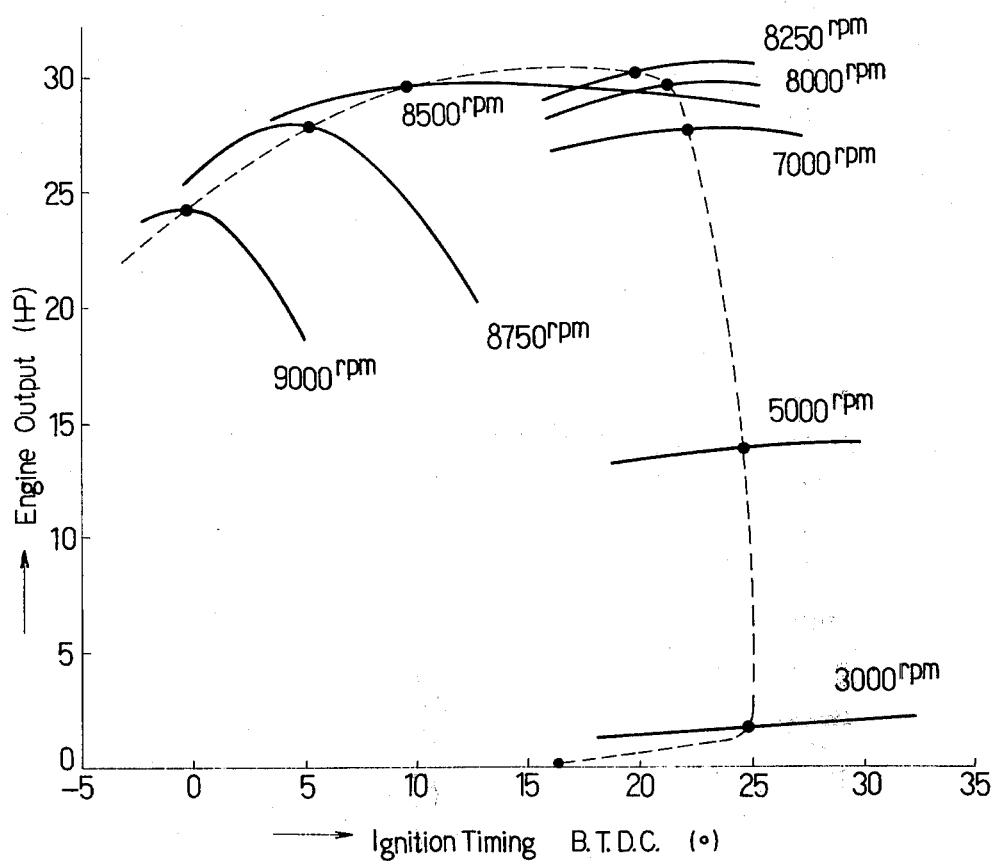
FIG. 1 is a diagram showing characteristic curves of the output power on a 2-cycle internal combustion engine with respect to the ignition timing.

Referring to FIG. 1 showing the characteristic curves of output power according to a 2-cycle internal combustion engine which is used for speed races with respect to the ignition timing, the respective solid lines show the output performances at respective operational speeds. When dotting the points of the respective maximum outputs on the respective lines as shown by a dotted line, it is noted that the ignition timing is sharply retarded above the rotational speed at which the maximum output is obtained, that is around 8,000 to 8,250 rpm.

Figure 2:
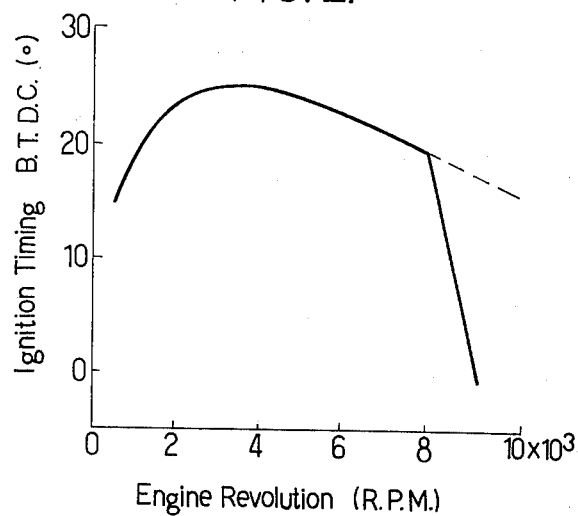
FIG. 2 is a diagram showing a characteristic curve of the ignition timing according to the present invention with respect to the operational speed.

This relation is shown in FIG. 2, in which a solid line designates a characteristic curve of the ignition timing with respect to the operational speed. A dotted line in FIG. 2 shows a characteristic curve according to the conventional method. As noted from FIG. 2, the ignition timing of the present invention, the solid line, is sharply retarded during the high-speed running ranges above 8,000 rpm, with respect to the conventional one.

Figure 3:
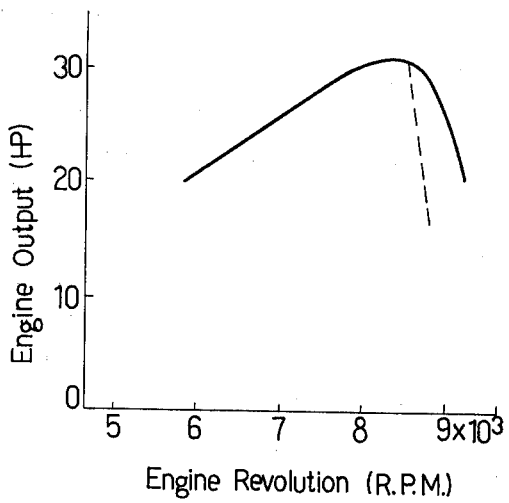
FIG. 3 is a diagram showing characteristic curves of the ignition timing according to the present invention and the conventional method with respect to the operational speed.

According to FIG. 3, a solid line showing the characteristic curve of the output power according to the present invention while a dotted line showing one according to the conventional method, it is noted that the maximum output power can be increased by the present invention.

Figure 4:
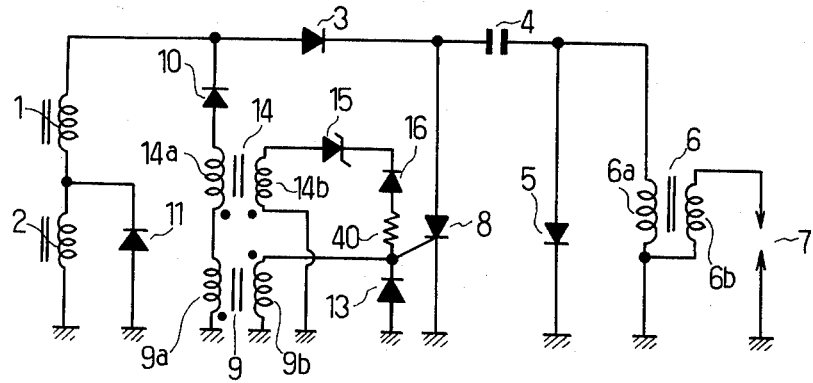
FIG. 4 is an electric wiring diagram of an ignition system for carring out the presetn invention.

Now referring to FIG. 4 showing one form of an ignition system, numerals 1 and 2 designate capacitor charging coils mounted in a magneto generator driven by a 2-cycle internal combustion engine for generating alternating current with the rotation of the magneto generator, wherein the coil 1 is especially designed to generate sufficient current at the high-speed running ranges and the coil 2 is contrarily designed to generate sufficient current at the low-speed running ranges. A diode 3, a capacitor 4 and a primary winding 6a of an ignition coil 6 are connected in series across the coils 1 and 2. A diode 5 is connected across the primary winding 6a for permitting the capacitor to rapidly charge the electric energy produced at the coils 1 and 2. A spark plug 7 is connected to a secondary winding 6b of the ignition coil 6 for igniting an air-fuel mixture in a combustion chamber of the engine. A switching device 8 such as a thyristor is connected at its anode to one end of the primary winding 6a via a junction between the diode 3 and the capacitor 4 and at its cathode to the other end of the primary winding 6a.

A first and a second transformer 9 and 14 are so arranged that the respective primary coils 9a and 14a are connected in series across the capacitor charging coils 1 and 2 through a diode 10, whereby only the half waves in one direction of the alternating current produced at the coils (hereinafter referred to as a negative half wave) are permitted to flow therethrough. A secondary coil 9b is connected across the gate and the anode of the thyristor 8, while a secondary coil 14b forms a closed loop circuit with a zener diode 15, a diode 16, a resistor 40 and a diode, wherein the gate of the thyristor 8 is connected to the closed loop circuit at the cathode of the diode 13. A diode 11 is connected across the capacitor charging coil 2 for ensuring the current generation at the coil 1.

An operation of the above ignition system, in which a two-pole magneto generator is, for example employed so that the capacitor charging coils 1 and 2 respectively generate one cycle of alternating current for each rotation of the magneto generator, will be described.

When the output voltage increases in one direction (hereinafter referred to as a positive half wave) at both the coils 1 and 2 during the low-speed and middle-speed running ranges of the engine, current flows from the coil 2 through the coil 1, the diode 3, the capacitor 4, a parallel circuit of the diode 5 and the primary winding 6a to the ground so as to charge the capacitor 4.

When the direction of the output voltage is reversed in the coils 1 and 2 the half wave in the opposite direction (hereinafter referred to as the negative half wave) at the coil 2 is short-circuited through the diode 11, while the negative half wave at the coil 1 causes current to flow thrugh the coil 2, the primary coil 9a of the first transformer 9, the primary coil 14a of the second transformer 14, and the diode 10 to the coil 1. This current causes both the first and the second transformer 9 and 14 to generate an output voltage at the respective secondary coils 9b and 14b, wherein the output at the secondary coil 9b is applied to the gate of the thyristor 8 while the output at the secondary coil 14b has no influence on the output at the coil 9b during the low-speed running ranges since the output at the coil 14b is insufficient to break the zener diode 15. When the output applied to the gate of the thyristor 8 exceeds a trigger level, the anode-cathode path of the thyristor 8 becomes conductive to permit the charge on the capacitor 4 to discharge through the anode-cathode path, the ground and the primary winding 6a of the ignition coil 6, whereby a high voltage is induced at the secondary winding 6b of the ignition coil 6, thus producing an ignition spark at the spark plug 7. The diode 5 acts to elongate the ignition spark at the spark plug 7.

The ignition timing determined by the output at the first transformer 9 is advanced as the engine speed increases during those low-speed and middle-speed running ranges depending on the fact that as the output at the secondary coil 9b increases as the engine speed increases, the timing at which the thyristor 8 is triggered to become conductive becomes earlier.

When the engine is operated at the high-speed running ranges, the capacitor 4 is mainly charged by the output at the coil 2. The current flows from the coil 1 through, the diode 3, the capacitor 4, the parallel circuit of the diode 5 and the primary winding 6a of the ignition coil 6 and the ground to the diode 11 when the positive half wave is generated at the coil 1. When the negative half wave is increased at the coil 1, the outputs at both the first and the second transformer 9 and 14 are respectively increased and the output at the secondary coil 14b exceeds the breakdown voltage of the zener diode 15. When the zener diode 15 becomes conductive current flows from the coil 14b through the ground, a parallel circuit of the diode 13 and the secondary coil 9b, the resistor 40, the diode 16 and the zener diode 15, offsetting the rising portion of the output voltage of the secondary coil 9b, whereby the ignition timing is greatly retarded. While the point, at which the zener diode 15 is driven into conduction, can be freely designed by changing the values of the breakdown voltage of the zener diode 15, the resistor 40 and so on, the point according to the present invention is selected at such a point (engine speed) where the engine can produce the maximum output power.

According to the present method for operating the 2-cycle internal combustion engine, the ingition timing is sharply and continuously retarded above the set engine speed as shown by a solid line in FIG. 2, and the engine output power is gradually decreased above the set engine speed as shown by a solid line in FIG. 3.

And the retarding rate of the ignition timing is preferably designed as to be a degree of from 10 to 20 per 1,000 rpm.

What is claimed is:

1. A method for operating a 2-cycle internal combustion engine having a combustion chamber comprising the steps of;

introducing an air-fuel mixture into said combustion chamber;

compressing the air-fuel mixture during the compression stroke of said engine;

igniting the compressed air-fuel mixture before said compression stroke ends, to thereby produce a power therein, the ignition timing for each igniting step being gradually advanced as the engine speed increases up to a set engine speed at which the engine can produce a maximum output power, the ignition timing being sharply and continuously retarded as the engine speed increases above said set engine speed; and discharging the burnt gases.

2. A method for operating a 2-cycle internal combustion engine having a combustion chamber comprising the steps of;

introducing an air-fuel mixture into said combustion chamber;

compressing the air-fuel mixture during the compression stroke of said engine;

igniting the compressed air-fuel mixture before said compression stroke comes to an end, at ignition timings gradually advancing for each igniting step as the engine speed increases up to a set engine speed at which the engine can produce a maximum output power, to thereby produce a power therein; and discharging burnt gases from said combustion chamber, wherein an improved method comprises the step of igniting the compressed air-fuel mixture for each igniting step at ignition timings sharply and continuously retarding as the engine speed increases above said set engine speed.

3. A method for operating a 2-cycle internal combustion engine as set forth in claim 2, wherein the ignition timing is retarded at a rate of a degree from 10 to 20 per 1,000 rpm.

4. A method for operating a 2-cycle internal combustion engine which comprises the steps of igniting compressed air-fuel mixture at an ignition timing and advancing said ignition timing for normal engine operation, wherein the improvement comprises the step of:

sharply and continuously retarding said ignition timing as the engine speed increases above a set engine speed at which said engine produces a maximum output power.

* * * * *